United States Patent
Ehmke et al.

(10) Patent No.: US 6,391,675 B1
(45) Date of Patent: May 21, 2002

(54) METHOD AND APPARATUS FOR SWITCHING HIGH FREQUENCY SIGNALS

(75) Inventors: John C. Ehmke, Garland; Charles L. Goldsmith, Plano; Zhimin J. Yao, Dallas; Susan M. Eshelman, Plano, all of TX (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/394,997

(22) Filed: Sep. 13, 1999

Related U.S. Application Data
(60) Provisional application No. 60/109,784, filed on Nov. 25, 1998.

(51) Int. Cl.[7] .................................................. H01L 21/00
(52) U.S. Cl. ............................ 438/53; 333/154; 335/35
(58) Field of Search ........................... 438/50, 52, 53; 307/109; 335/35; 333/151, 154

(56) References Cited

U.S. PATENT DOCUMENTS

| | | | |
|---|---|---|---|
| 4,905,070 A | * | 2/1990 | Lesk et al. .................. 357/51 |
| 4,908,685 A | | 3/1990 | Shibasaki et al. ........... 357/27 |
| 5,233,459 A | * | 8/1993 | Bozler et al. ............... 359/230 |
| 5,374,843 A | * | 12/1994 | Williams et al. ........... 257/492 |
| 5,502,325 A | | 3/1996 | Sokolich et al. ........... 257/421 |
| 5,771,321 A | * | 6/1998 | Stern ............................. 385/31 |

FOREIGN PATENT DOCUMENTS

EP   0 709 911 A2   10/1995   ............ H01P/1/12

OTHER PUBLICATIONS

International Search Report dated Feb. 18, 2000, for PCT/US99/25643.

C. Goldsmith, J. Randall, S. Eshelman, T.H. Lin, D. Denniston, S. Chen, B. Norvell; Characteristics of Micromachined Switches at Microwave Frequencies; Texas Instruments Incorporated, Dallas, Texas; *IEEE MTT–S Digest*, pp. 141–144, ©Jun. 17, 1996.

PCT Written Opinion (PCT Rule 66), mailed Sep. 15, 2000, re PCT/US99/25643 filed Nov. 1, 1999, Applicant's reference: 004578.0734.

* cited by examiner

*Primary Examiner*—Carl Whitehead, Jr.
*Assistant Examiner*—Jeff Vockrodt
(74) *Attorney, Agent, or Firm*—Baker Botts L.L.P.

(57) ABSTRACT

A switch includes a conductive region, a membrane, and a dielectric region. The dielectric region is formed from a dielectric material and is disposed between the membrane and the conductive region. When a sufficient voltage is applied between the conductive region and the membrane, a capacitive coupling between the membrane and the conductive region is effected. The dielectric material has a resistivity sufficiently low to inhibit charge accumulation in the dielectric region during operation of the switch.

11 Claims, 3 Drawing Sheets

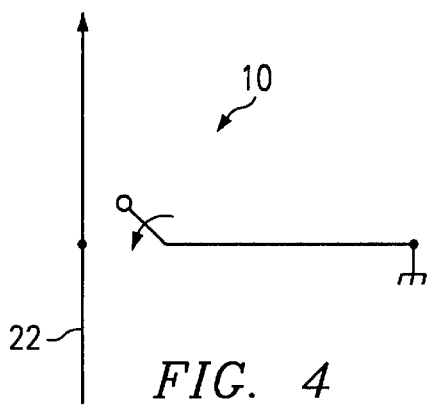
FIG. 4
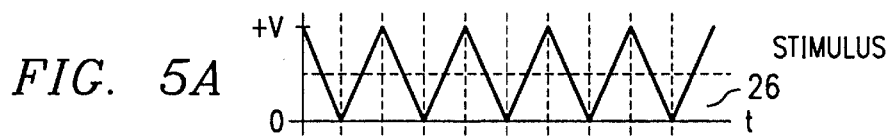
FIG. 5A — STIMULUS
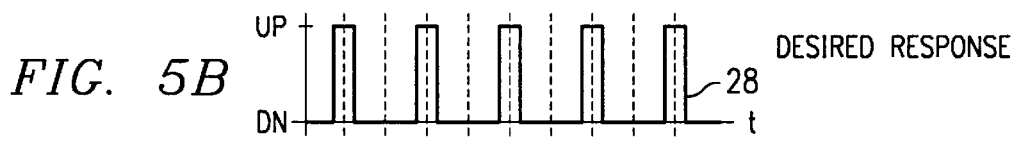
FIG. 5B — DESIRED RESPONSE
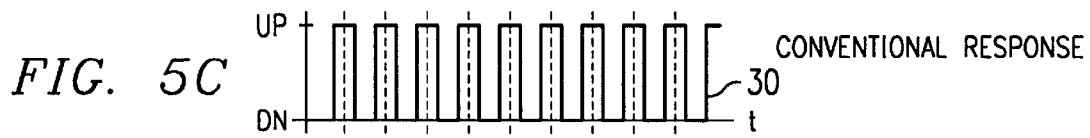
FIG. 5C — CONVENTIONAL RESPONSE
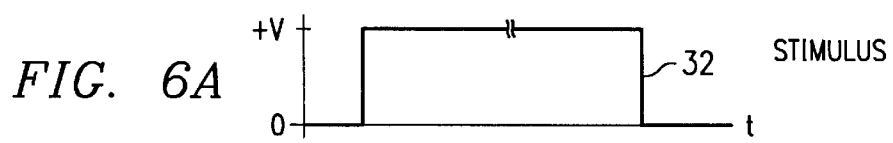
FIG. 6A — STIMULUS
FIG. 6B — DESIRED RESPONSE
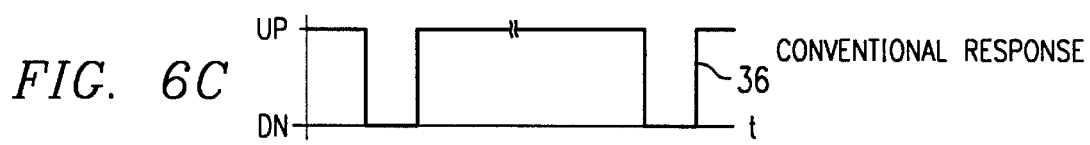
FIG. 6C — CONVENTIONAL RESPONSE

METHOD AND APPARATUS FOR SWITCHING HIGH FREQUENCY SIGNALS

CROSS REFERENCE TO RELATED APPLICATIONS

This application claims the benefit under 35 USC §119(e) of U.S. Provisional Application Ser. No. 60/109,784, filed Nov. 25, 1998, having a title of Method and Apparatus for Switching High Frequency Signals.

GOVERNMENT RIGHTS

This invention was made with Government support under Contract No. N66001-96-C-8623. The Government has certain rights in this invention.

TECHNICAL FIELD OF THE INVENTION

This invention relates generally to electronic devices and more particularly to a method and apparatus for switching high frequency signals.

BACKGROUND OF THE INVENTION

Microelectromechanical microwave (MEMS) capacitive switches can be used for switching high frequency signals. Examples of microelectromechanical microwave capacitive switches are described in U.S. Pat. No. 5,619,061 entitled, Micromechanical Microwave Switching, which is incorporated herein by reference. Such switches may be used for functions such as beam steering in a phased array radar. MEMS capacitive switches generally are low loss devices because they include no active semiconductor components. The lack of active semiconductor components also makes MEMS capacitive switches relatively inexpensive.

A problem with some implementations of microelectromechanical microwave capacitive switches is that they show an inability to remain in a switched on position for more than a few seconds at low frequency bias voltages and show a bipolar response when exposed to high-frequency bias voltages. Bipolar response refers to switching on at both zero and positive bias.

SUMMARY OF THE INVENTION

Accordingly, a need has arisen for an improved method and apparatus for method and apparatus for dielectric charges reduction in micromechanical microwave capacitive switches that address shortcomings of prior methods and apparatuses.

According to one embodiment of the invention, a method of forming a switch includes providing a conductive region, a membrane, and a dielectric material. The method includes disposing a region of the dielectric material between the conductive region and the membrane such that a sufficient voltage applied between the conductive region and the membrane effects a capacitive coupling between the membrane and the conductive region. The dielectric material has a resistivity sufficiently low to inhibit charge accumulation in the dielectric region during application of the voltage.

According to another embodiment of the invention, a switch includes a conductive region, a membrane, and a dielectric region. The dielectric region is formed from a dielectric material and is disposed between the membrane and the conductive region. When a sufficient voltage is applied between the conductive region and the membrane, a capacitive coupling between the membrane and the conductive region is effected. The dielectric material has a resistivity sufficiently low to inhibit charging in the dielectric region during operation of the switch.

Embodiments of the invention provide numerous technical advantages. For example, in one embodiment of the invention, a switch is provided that does not suffer from bipolar operation in response to high frequency stimulus and does not turn off inadvertently when it should be turned on in response to low frequency stimulus, which are disadvantages associated with some prior devices. Further, according to the invention, a switch is provided that can be repeatedly activated in response to a bias voltage having a fairly constant magnitude. Such switches provide more reliable operation and are desirable. Other technical advantages are readily apparent to one skilled in the art from the following figures, descriptions, and claims.

BRIEF DESCRIPTION OF THE DRAWINGS

For a more complete understanding on the present invention and the advantages thereof, reference is now made to the following descriptions taken in connection with the accompanying drawings in which:

FIG. 4 is a circuit diagram illustrating an effective electrical circuit at high frequency of the microelectromechanical microwave capacitive switch illustrated in FIGS. 1 through 3;

FIGS. 5A through 5C are a series of graphs illustrating a desired response and a conventional response for microelectromechanical microwave capacitive switches for high frequency stimulus;

FIGS. 6A through 6C are a series of graphs showing a desired response and a conventional response for microelectromechanical microwave capacitive switches in response to a low frequency stimulus;

DETAILED DESCRIPTION OF THE INVENTION

The present invention and its advantages are best understood by referring to FIGS. 1 through 8 of the drawings, like numerals being used for like and corresponding parts of the various drawings.

Figure 1:
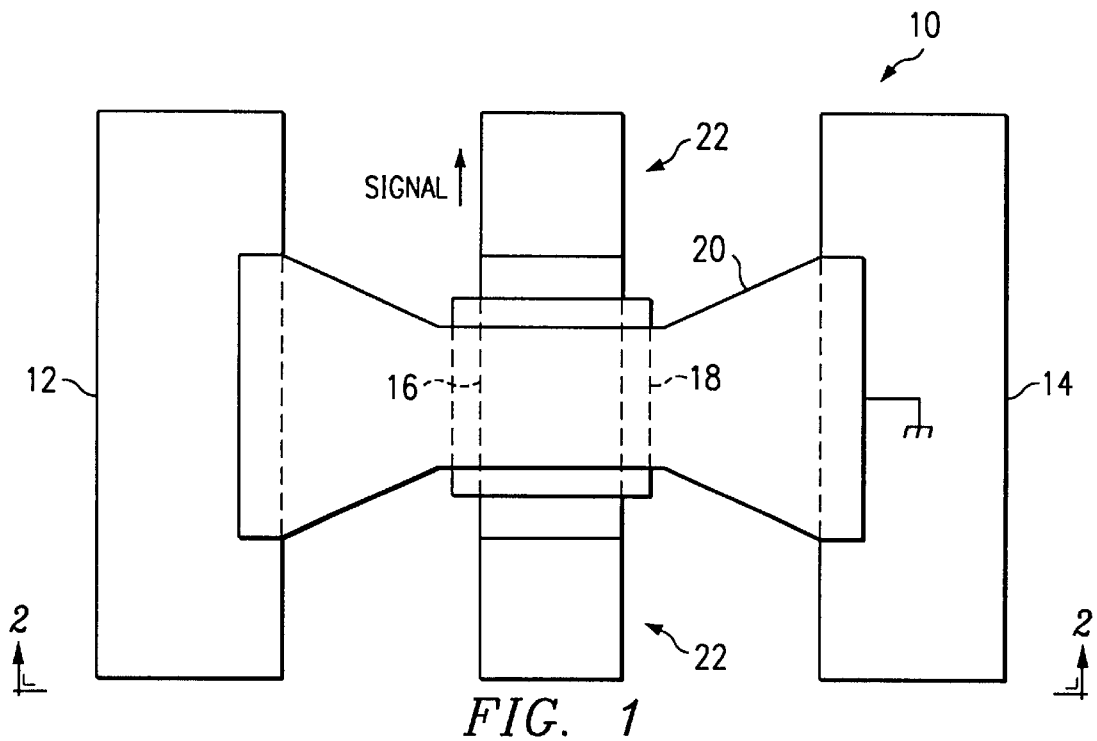
FIG. 1 is a schematic drawing illustrating a top view of a microelectromechanical microwave capacitive switch according to the teachings of the present invention.
Figure 2:
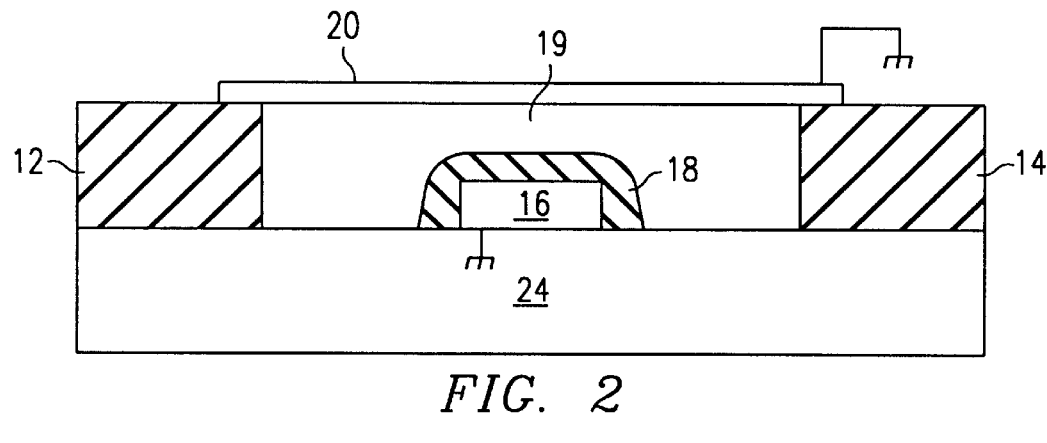
FIG. 2 is a side view of the microelectromechanical microwave capacitive switch illustrated in FIG. 1 in an undeflected position.
Figure 3:
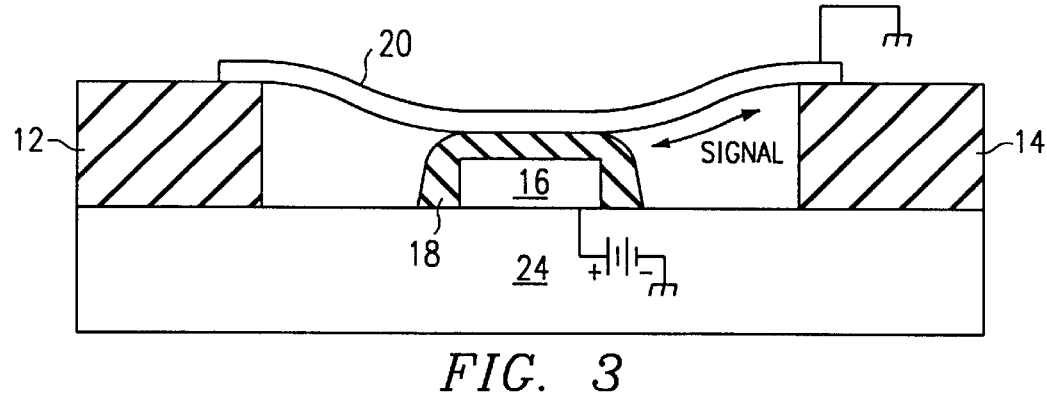
FIG. 3 is a schematic drawing illustrating the microelectromechanical microwave capacitive switch of FIG. 1 in a deflected position.

FIGS. 1 through 3 are schematic drawings illustrating one embodiment of a microelectromechanical microwave (MEMS) capacitive switch 10 according to the teachings of the present invention. FIG. 1 shows a top view of switch 10. FIG. 2 shows a side view along the lines 2—2 of FIG. 1 for an undeflected position. FIG. 3 shows a side view along lines 2—2 of FIG. 1 for a deflected position.

Switch 10 includes membrane posts 12 and 14. Membrane post 12 and 14 are generally formed from any suitable conductive material; however, membrane posts 12 and 14 may also be insulative if desired. Disposed between membrane posts 12 and 14 is an electrode 16. Electrode 16 is connected to, or forms a part of, a transmission line 22. Transmission line 22 carries a high frequency signal. Overlying electrode 16 is a dielectric region 18. In one embodiment, dielectric region 18 is formed from silicon nitride ($Si_3N_4$). However, any suitable dielectric may be used. As described in greater detail below, dielectric region 18 is formed from a dielectric material having a sufficiently low resistivity to inhibit charge accumulation within dielectric region 18. A membrane 20 is disposed between membrane support posts 12 and 14, as best illustrated in FIG. 2. Membrane 20 is connected to a reference voltage, such as ground. According to one embodiment, membrane 20 is formed from a conductive material. A gap 19 exist between membrane 20 and dielectric region 18, as illustrated in FIG. 2. In one embodiment, membrane posts 12 and 14, electrode 16, dielectric region 18, and membrane 20 are formed overlying a substrate 24.

If a DC bias voltage is applied to electrode 16 and membrane 20 is held at ground, as illustrated in FIG. 3, membrane 20 is deflected downward, due to an electric field created between membrane 20 and electrode 16 by the bias voltage, until it rests on dielectric region 18. This contact forms a capacitive coupling that effectively shorts high frequency signals between transmission line 22 and ground. Thus, transmission of a high frequency signal along transmission line 22 can be prevented by application of a bias voltage between electrode 16 and membrane 20.

FIG. 4 is a simplified circuit diagram illustrating an effective circuit of microelectromechanical microwave capacitive switch 10. As illustrated, when microelectromechanical microwave capacitive switch 10 is closed, signals along transmission line 22 are shorted to ground. This closing of microelectromechanical switch 10 corresponds to the position of membrane 20 illustrated in FIG. 3. As described above, this positioning of membrane 20 is effected by application of a bias voltage between electrode 16 and membrane 20.

As described in greater detail below, the invention recognizes that, during application of a bias voltage, charge tends to be injected from either membrane 20 or electrode 16 into dielectric region 18. This charge, once injected, occupies trap sites within dielectric region 18 and creates a shielding effect that effectively lowers the electric field between electrode 16 and membrane 20. When the injected charge reaches sufficient levels, the electrostatic attraction between electrode 16 and membrane 20 is neutralized and membrane 20 returns to its rest, or up position. This results in a spontaneous and undesired release of microelectromechanical microwave capacitive switch 10. According to the teachings of the invention, reducing the resistivity of the material used for dielectric region 18 inhibits charge accumulation and effects a more desirable microelectromechanical microwave mechanical capacitive switch.

FIGS. 5A through 5C are a series of graphs illustrating the position of a microelectromechanical microwave capacitive switch in response to a high frequency stimulus. Curve 26 in FIG. 5A represents a high frequency stimulus for a bias voltage applied between electrode 16 and membrane 20. Curve 28 in FIG. 5B illustrates a desired response of microelectromechanical microwave capacitive switch 10. For curve 28, an "Up" position indicates that membrane 20 is as illustrated in FIG. 2 and a gap 19 is maintained between membrane 20 and dielectric region 18. In such a position, microelectromechanical microwave capacitive switch 10 allows signals to flow along transmission line 22. Conversely, a "Dn" position indicates that microelectromechanical microwave capacitive switch 10 is in a down position, being in contact with dielectric region 18. In such a position, microelectromechanical microwave capacitive switch 10 shorts high frequency signals to ground and therefore halts transmission of high frequency signals along transmission line 22.

Desired response curve 28 shows that microelectromechanical microwave capacitive switch is in a "Dn" position only when an appropriate bias voltage is applied between electrode 16 and membrane 20, corresponding to closing of the switch. Curve 30 in FIG. 5C illustrates a problem that occurs in some conventional microelectromechanical microwave capacitive switches. With operation as shown by curve 30, the switch toggles at a rate equal to twice the desired rate. This operation is undesirable. The invention recognizes that the behavior of some conventional microelectromechanical microwave capacitive switches as exhibited by curve 30 occurs due to charge injection and accumulation, which is described in greater detail below in conjunction with FIGS. 8A through 8C.

FIGS. 6A through 6C are a series of graphs illustrating the operation of microelectromechanical microwave capacitive switches in response to a low frequency stimulus. Curve 32 in FIG. 6A illustrates an example of low frequency stimulus in which a positive bias voltage applied between electrodes 16 and membrane 20 generates the desired response illustrated by curve 34, shown in FIG. 6B. Curve 36 in FIG. 6C illustrates a response resulting from some conventional microelectromechanical microwave capacitive switches in which the membrane of the microelectromechanical switch toggles back to an up position when it should be in a down position. Thus, after some period of time, the membrane returns to an "Up" position even when a bias voltage is maintained. The invention recognizes that the behavior of some conventional microelectromechanical microwave capacitive switches as exhibited by curve 36 occurs due to charge injection and accumulation, which is described in greater detail in conjunction with FIGS. 8A through 8C.

Figure 7A:
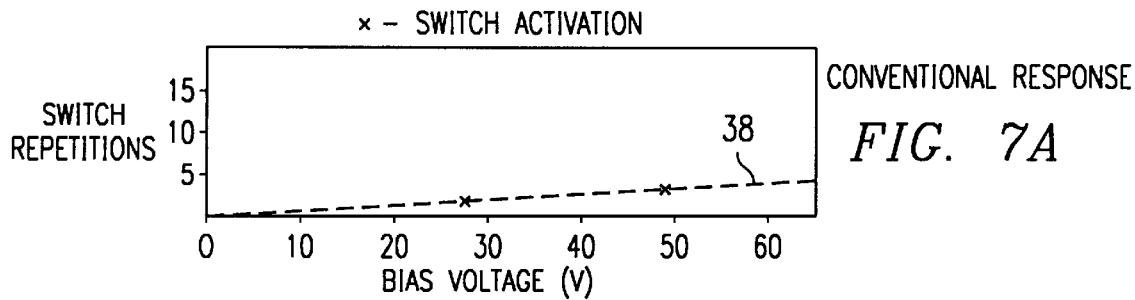
FIGS. 7A through 7B are a series of graphs of switch repetition versus bias voltage illustrating an increasing bias voltage required with switch repetitions.
Figure 7B:
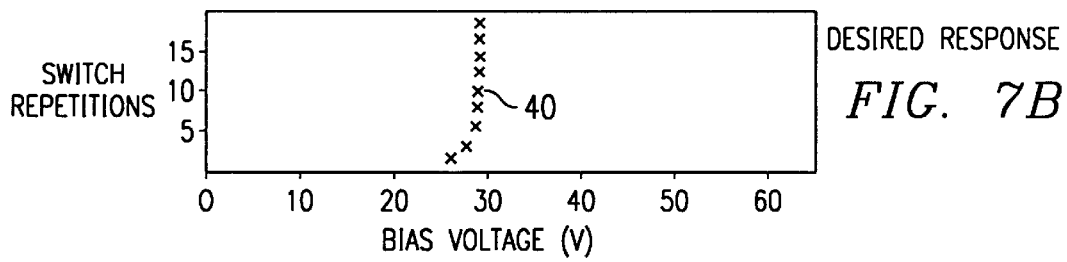

FIGS. 7A and 7B are a series of graphs showing switch repetitions versus bias voltage. In curve 38 in FIG. 7A, the voltage required to displace membrane 20 downward to contact dielectric region 18 is illustrated as a function of the number of switch repetitions. As illustrated, the bias voltage required to effect such contact increases as the number of times the switch is opened and closed increases. A more desirable response is illustrated by curve 40 in FIG. 7B in which the bias voltage required to displace membrane 20 to contact dielectric region 18 remains fairly constant after a few switch repetitions. The behavior as illustrated by curve 38 is also attributed to charge injection and accumulation.

Figure 8A:
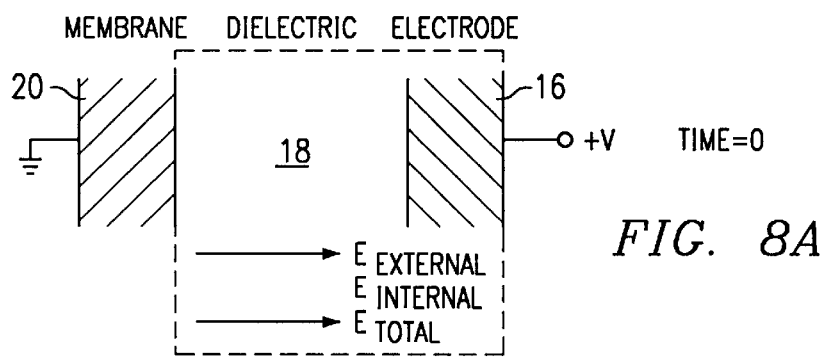
FIGS. 8A through 8C are a series of schematic drawings illustrating the formation of electric fields between a membrane and an electrode of the microelectromechanical microwave capacitive switch of FIG. 1.
Figure 8B:
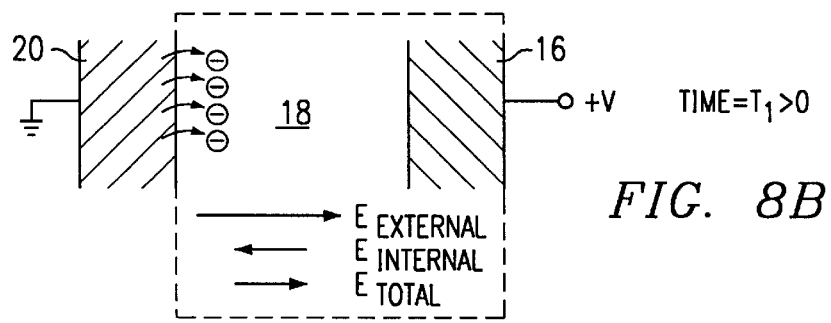
Figure 8C:
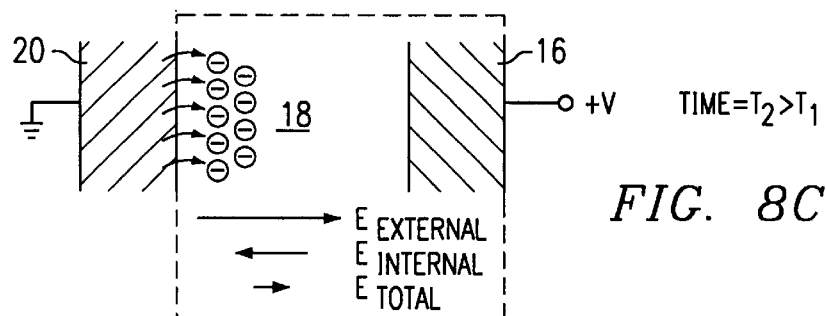

FIGS. 8A through 8C illustrate the generation of an electric field between membrane 20 and electrode 16 for three time periods: time t=0; time $t=t_1,>0$; and time $t=t_2>t_1$. The cause of the above-described undesirable behaviors of some microelectromechanical microwave capacitive switches is further described in conjunction with FIG. 8.

For time t=0, an external electric field due to a bias voltage applied between electrode 16 and membrane 20 has the same magnitude as the total electric field between electrode 16 and membrane 20 because there is no internally generated electric field within dielectric region 18. However, at time $t_1$, electrical charges begin to accumulate within dielectric region 18. These electrical charges are injected into dielectric region 19 due to the applied bias voltage.

These electrical charges generate an internal electric field that opposes the externally applied electric field. Thus, the total electric field between membrane 20 and electrode 16 is reduced. At some time $t_2$ the total electric field between membrane 20 and electrode 16 is reduced to an extent that membrane 20 will return to an "open" position. Thus, the accumulation of a charge that is injected into dielectric region 19 by application of a bias voltage creates an electric field opposing the externally applied electric field generated by application of a bias voltage. This charge accumulation is responsible for the behavior of conventional microelectromechanical microwave mechanical capacitive switches as exhibited by curve 36 in FIG. 6C.

Charge accumulation is also responsible for the behavior of conventional microelectromechanical microwave mechanical capacitive switches in response to low frequency stimulation as exhibited by curve 38 in FIG. 7A. Each time a bias voltage is applied between membrane 20 and electrode 16, a little more charge is injected into dielectric region 18. This additional charge creates a stronger electric field opposing an externally applied electric field resulting from the bias voltage. Therefore, to attain an electric field sufficient to displace membrane 20 to contact dielectric region 18, a greater bias voltage is required for each successive switch repetition.

Charge accumulation is also responsible for the behavior of conventional microelectromechanical microwave mechanical capacitive switches in response to high frequency stimulation as exhibited by curve 30 in FIG. 5C. This phenomena, which results in switching at twice the desired frequency, occurs due to charge accumulation resulting from charge injection by application of a bias voltage. Upon application of a bias voltage, charge is injected into dielectric region 18. The bias voltage then returns to zero at a desired time, but the accumulated charge creates a net electric field in dielectric region 18. This net electric field causes a potential difference between electrode 16 and membrane 20, which causes membrane 20 to again displace toward electrode 16. This displacement occurs even though the externally applied bias voltage is zero. Therefore, switching occurs at twice the desired rate. This operation is referred to as bipolar operation.

According to the teachings of the present invention, such problems associated with charge injection and accumulation may be addressed by depositing dielectric region 18 in such a way as to make it "leaky." In other words, dielectric region 18 is deposited with a material having an increased conductivity, or decreased resistivity, to inhibit charge accumulation in dielectric region 18 during operation of switch 10. As used herein, according to one embodiment, "inhibit charge accumulation" refers to preventing charge accumulation to an extent that microelectromechanical microwave mechanical capacitative switches, during standard operating conditions, generally do not exhibit bipolar response in response to high frequency stimulus or generally do not switch to an "Up" position when they should be in a "Dn" position in response to low frequency stimulus, but not necessarily both. Thus inhibition of charge accumulation occurs if one or more of these two behaviors is generally prevented.

Forming dielectric region 18 with decreased resistivity allows migration of the injected charges through dielectric region 18 and avoids charge buildup. According to the invention, increasing the conductivity of dielectric region 18 may be achieved in several ways: dielectric layer 18 may be intentionally doped with an external dopant; the internal stoichiometry may be modified; pre or post processing steps can be introduced or modified; or other suitable techniques that increase the conductivity of dielectric region 18 may be utilized. Although the particular increases from standard conductivities associated with dielectric material used in conventional microelectromechanical microwave capacitive switches varies by application, bias voltage, and magnitude of electric field, increasing the conductivity by a factor of a 10,000 over standard values has been shown to be particularly advantageous and produced the above-described desirable results.

According to one embodiment of the invention, silicon nitride ($Si_3N_4$) is deposited stoichiometrically by plasma enhanced chemical vapor deposition. The conductivity of SiN is sensitive to the Si/N ratio. By increasing the silicon concentration in the film and making the film silicon-rich, the dielectric becomes leaky and prevents charge by accumulation problems. In one embodiment of the invention, the resistivity of the silicon nitride used to form dielectric region 18 was reduced from $1 \times 10^{11}$ to $1 \times 10^7$ Ohm-cm. This resistivity occurs in the presence of an electrical field having a magnitude of 200 kilovolts per centimeter.

Although the present invention and its advantages have been described in detail, it should be understood that various changes, substitutions, and alterations can be made therein without departing from the spirit and scope of the present invention as defined by the appended claims.

What is claimed is:

1. A method of forming a switch, the method comprising:
    providing a conductive region;
    providing a membrane;
    providing a dielectric material;
    disposing a region of the dielectric material between the conductive region and the membrane such that a sufficient voltage applied between the conductive region and the membrane effects a capacitive coupling between the membrane and the conductive region; and
    wherein providing the dielectric material comprises providing a dielectric material having a resistivity of no greater than approximately $1 \times 10^7$ ohm-cm.

2. The method of claim 1 wherein providing the dielectric material comprises providing a dielectric material having a resistivity sufficiently low to generally prevent bipolar operation of the switch.

3. The method of claim 1 wherein providing the dielectric material comprises providing a dielectric material having a resistivity sufficiently low to generally prevent release of the capacitive coupling while the sufficient voltage is applied.

4. A method of forming a capacitive switch, the method comprising:
    providing a substrate;
    disposing a conductive region overlying the substrate;
    disposing a dielectric region overlying the conductive region;
    disposing a membrane over the dielectric region such that a sufficient voltage applied between the conductive region and the membrane effects a capacitive coupling between the membrane and the conductive region; and
    wherein disposing a dielectric region overlying the conductive region comprises providing a dielectric material having a resistivity that is no greater than approximately $1 \times 10^7$ ohm-cm.

5. The method of claim 4 wherein providing the dielectric material comprises providing a dielectric material having a resistivity sufficiently low to generally prevent bipolar operation of the switch.

6. The method of claim 4 wherein providing the dielectric material comprises providing a dielectric material having a resistivity sufficiently low to generally prevent release of the capacitive coupling while the sufficient voltage is applied.

7. The method of claim 4, wherein providing a dielectric material comprises providing a dielectric material having a resistivity sufficiently low to generally prevent bipolar operation of the switch and sufficiently low to generally prevent release of the capacitive coupling while the sufficient voltage is applied.

8. The method of claim 1, wherein the resistivity of the dielectric material is approximately $1 \times 10^7$ ohm-cm.

9. The method of claim 4, wherein the resistivity of the dielectric material is approximately $1 \times 10^7$ ohm-cm.

10. The method of claim 1, wherein the dielectric material is silicon nitride.

11. The method of claim 4, wherein the dielectric material is silicon nitride.

* * * * *